(12) United States Patent
Khalil et al.

(10) Patent No.: US 9,178,979 B1
(45) Date of Patent: Nov. 3, 2015

(54) METHOD AND APPARATUS FOR INITIATING COMMUNICATION MODES

(71) Applicant: AT&T Intellectual I, LP, Atlanta, GA (US)

(72) Inventors: Mohamed Khalil, Redmond, WA (US); Sadik Alsadi, Newcastle, WA (US); Mazen Aladwan, Sammamish, WA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

(21) Appl. No.: 14/332,969

(22) Filed: Jul. 16, 2014

(51) Int. Cl.
| | | |
|---|---|---|
| *H04W 4/00* | (2009.01) | |
| *H04M 1/725* | (2006.01) | |
| *H04L 29/06* | (2006.01) | |
| *H04W 60/06* | (2009.01) | |
| *H04W 80/10* | (2009.01) | |
| *H04W 88/06* | (2009.01) | |

(52) U.S. Cl.
CPC ....... *H04M 1/72552* (2013.01); *H04L 65/1006* (2013.01); *H04L 65/1073* (2013.01); *H04W 60/06* (2013.01); *H04W 80/10* (2013.01); *H04L 65/1016* (2013.01); *H04W 88/06* (2013.01)

(58) Field of Classification Search
CPC .................. H04M 1/72591; H04M 3/42391; H04M 19/047; H04M 1/2475; H04M 1/72527; H04M 1/6058; H04M 1/72588; H04W 4/14; G10L 15/26; G10L 15/265; G10L 25/78; H04L 65/1006; H04L 65/1073; H04L 65/1016; H04L 65/1069; H04L 65/105; H04L 29/06326; H04L 65/1083; H04L 51/38; H04L 61/1529; H04L 29/06217; H04L 65/1063; H04L 29/06197; H04L 29/06265
USPC .............. 379/52, 93.05; 455/432.3, 411, 466, 455/435.2, 414.1, 415, 418, 435.1, 458, 455/556.1; 709/227, 228, 217, 223, 224, 709/206, 225, 220; 370/328, 259; 726/4; 358/1.15
See application file for complete search history.

(56) References Cited

U.S. PATENT DOCUMENTS

| | | | |
|---|---|---|---|
| 7,529,562 | B2 | 5/2009 | Van Bosch et al. |
| 7,643,619 | B2 | 1/2010 | Jung |
| 7,885,388 | B2 | 2/2011 | Wong et al. |
| 8,189,744 | B2 | 5/2012 | Jean et al. |
| 8,190,183 | B2 | 5/2012 | Fields et al. |
| 8,213,985 | B2 | 7/2012 | Choi |
| 2007/0061151 | A1 | 3/2007 | Groskreutz et al. |
| 2008/0108348 | A1* | 5/2008 | Kottilingal et al. ........ 455/435.1 |
| 2008/0118056 | A1 | 5/2008 | Hjelmeland et al. |
| 2010/0272243 | A1 | 10/2010 | Dougall et al. |
| 2013/0331056 | A1* | 12/2013 | McKown et al. .......... 455/404.1 |

* cited by examiner

*Primary Examiner* — Fred Casca
(74) *Attorney, Agent, or Firm* — Guntin & Gust, PLC; Douglas Schnabel

(57) ABSTRACT

Aspects of the subject disclosure may include, for example, a method for receiving, by a system comprising a processor, a first request to transition a communication device between a hearing mode and a teletype mode, and transmitting, by the system, a SIP command to a telecommunication network to switch between registration and deregistration of the communication, where the SIP command is transmitted responsive to expiration of a period for disabling switching between the registration and the deregistration. Other embodiments are disclosed.

20 Claims, 13 Drawing Sheets

400

500

600

700

800

1000

METHOD AND APPARATUS FOR INITIATING COMMUNICATION MODES

FIELD OF THE DISCLOSURE

The subject disclosure relates to a method and apparatus for initiating communication modes, and, more particularly, for transitioning communication device between hearing and teletype modes.

BACKGROUND

Modern telecommunications systems allow consumers to utilize telephony capabilities while accessing a large variety of content. Consumers are no longer bound to specific locations when communicating with others or when enjoying content, including video programming. Network capabilities have expanded and have created additional interconnections and new opportunities for using mobile communication devices in a variety of situations. Intelligent devices offer new means for the enjoyment of network interactions in ways that anticipate consumer desires.

BRIEF DESCRIPTION OF THE DRAWINGS

Reference will now be made to the accompanying drawings, which are not necessarily drawn to scale, and wherein.

DETAILED DESCRIPTION

Figure 1:
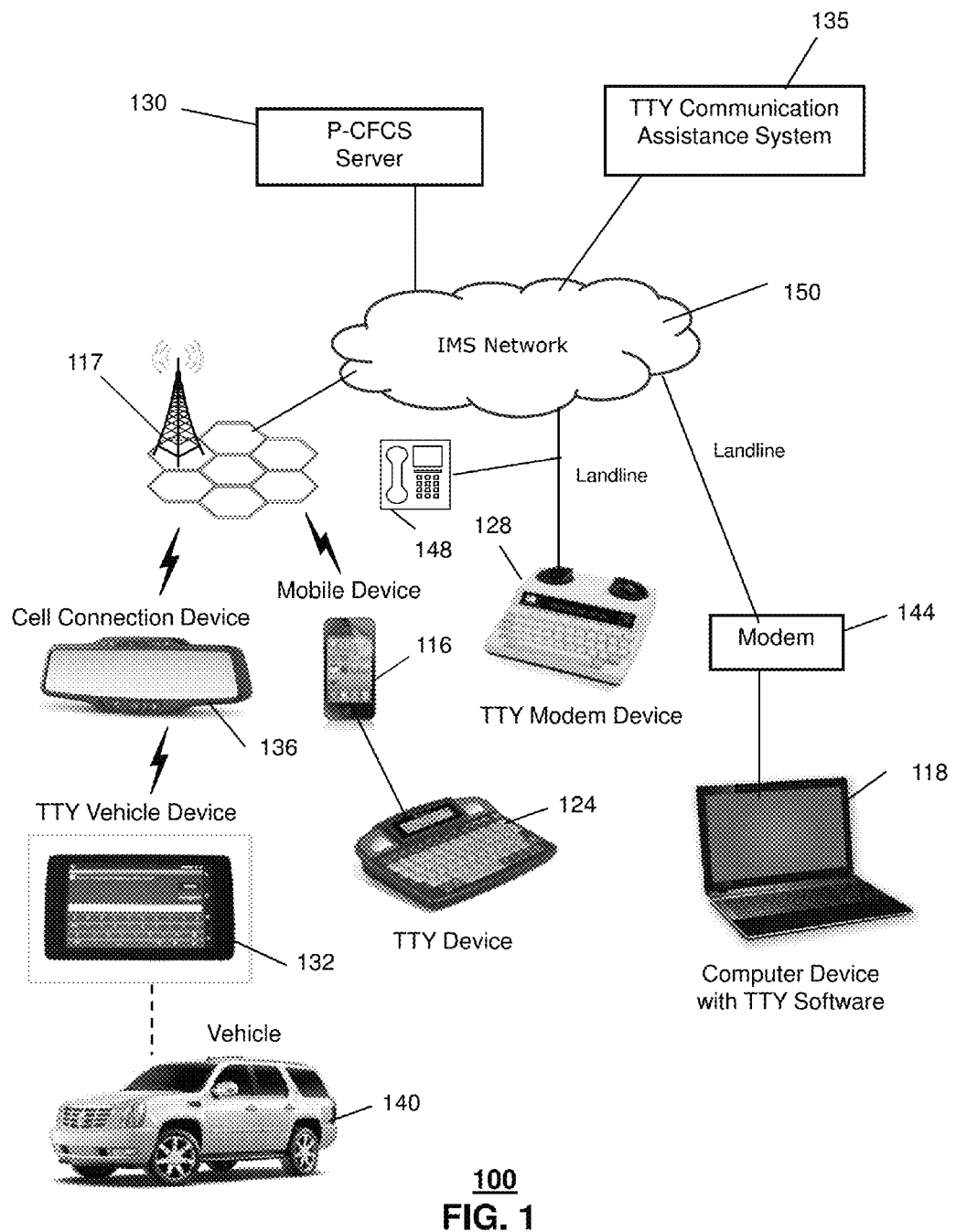
FIG. 1 depicts illustrative embodiments of a system that can be utilized for providing teletype communication services.

The subject disclosure describes, among other things, illustrative embodiments for reliably transitioning communication devices between hearing and teletype modes in a telecommunication system. A request for transitioning between hearing and teletype modes can be received at a communication device. Processing of the request can be delayed for a period of time to ensure that the prior registration process between the communication device and the telecommunication system has completed before initiating a new registration process based on the request. Methods for preventing multiple registration processing attempts can be implemented at the communication device or at the telecommunication system.

One embodiment of the subject disclosure includes a communication device comprising a memory to store executable instructions and a processor. The processor, responsive to executing the executable instructions, can perform operations including receiving an input from a user interface requesting a transition from a hearing mode to a teletype mode. The processor can also perform operations comprising generating a first session initiation protocol (SIP) command for switching from registration to deregistration of the communication device at a telecommunication network responsive to the input. The first SIP command can initiate deregistration of the communication device when transitioning from the hearing mode to the teletype mode. The processor can also perform operations comprising determining whether a disable registration period has been started and, in turn, initiating the disable registration period responsive to the disable registration period not having been started. The processor can further perform operations comprising determining whether the disable registration period has expired responsive to the disable registration period having been started. The processor can further perform operations comprising transmitting the first SIP registration command as a first request to the telecommunication network to switch from the registration to the deregistration of the communication device responsive to the disable registration period having expired. The processor can also perform operations comprising transitioning from the hearing mode to the teletype mode according to a response from the telecommunication network.

One embodiment of the subject disclosure includes a computer-readable storage device, comprising executable instructions. The executable instructions can cause a processor to perform operations comprising receiving from a communication device a first SIP command comprising a first request for a first switch between registration and deregistration of the communication device at a telecommunication network. The executable instructions can further cause the processor to perform operations comprising transmitting to the communication device a second SIP command requesting authentication responsive to the first request. The executable instructions can also cause the processor to perform operations comprising receiving from the communication device a third SIP command responsive to the second SIP command. The executable instructions can cause a processor to perform operations comprising determining whether the third SIP command comprises a second request for a second switch between the registration and the deregistration of the communication device and, in turn, determining whether the second request is received before completion of the first switch. The executable instructions can cause a processor to perform operations comprising transmitting to the communication device a fourth SIP command comprising a first disabling of further attempts to switch between the registration and the deregistration of the communication device responsive to receiving the second request before completion of the first switch, wherein the first disabling comprises a first expiration time.

One embodiment of the subject disclosure includes a method including receiving, by a system comprising a processor, a first request to transition a communication device between a hearing mode and a teletype mode. The method can also include transmitting, by the system, a SIP command to a telecommunication network to switch between registration and deregistration of the communication. The SIP command can be transmitted responsive to expiration of a period for disabling switching between the registration and the deregistration.

FIG. 1 depicts an illustrative embodiment of a system 100 that can be utilized for providing telecommunication services for the deaf, hard of hearing, and/or the speech impaired. In one or more embodiments, the system 100 can include a communication network 150. The system 100 can include a subscription telecommunication service, such as an Internet Protocol Multimedia Subsystem (IMS) network 150 for providing landline or cellular/mobile telecommunications, Internet access, and content to consumers. The telecommunication services of the system 100 and the IMS network 150 can be accessed using a variety of communication devices and connectivity schemes. In one embodiment, an accessory teletype (TTY) device 124 can be coupled to a mobile communication device 116 such that the TTY accessory device 124 can accesses the IMS network 150 via a mobility network of mobile base stations 117. In one embodiment, a direct TTY device 128 can be coupled to the IMS network 150 via a landline. In one embodiment, a computer device 118 can operate or host a TTY software application, where the computer device 118 can access the IMS network via an internal modem or an external modem 144 and a landline. In one embodiment, a mobile TTY device 132 can be used in a vehicle 140. The mobile TTY device 132 can communicate wirelessly, such as through a Bluetooth connection, to a cell connection device 136 in the vehicle 135. In one embodiment, the cell connection device 136 can be in the form of a mirror which can include an integrated mobile cell phone for communicating wirelessly with a mobility network of mobile base stations 117.

In one or more embodiments, the TTY capable devices 118, 124, 128, and 132 provide a text-based system to allow deaf, hard of hearing, and/or the speech impaired users to communicate among themselves and/or with hearing individuals. A TTY device 124 is a teleprinter, or electronic device for text communication over a telephone line. A person with a hearing or speech difficulty can use the TTY device 124 to place a call to another person with a TTY device 124 and/or to another person and a non-TTY device, such as a cell phone 116 or a landline phone. Once a TTY call is initiated over the IMS network 150, whether via a landline or a mobility network 117, this hearing and or speech impaired person can communicate via a keyboard or keypad entry and a display at the TTY device 124. If a first user of a TTY device 124 is communicating with a second user, who is also using the TTY device, then the communications between the two users can be entirely via text that is entered at the keyboard and presented at the display. In another embodiment, a hearing and or speech impaired user at a TTY device 124 can communicate with a non-impaired user, who is using a non-TTY device. In one embodiment, the user of the TTY device 124 can place the call via a TTY communication assistance system 135, where a live operator can answer the call and provide text to voice and/or voice to text translation services to allow the hearing and/or speech impaired user at the TTY device 124 to communicate with a non-hearing impaired user at a non-TTY device. The non-hearing impaired user can engage in a speech and/or hearing based call session while the hearing and/or speech impaired caller can engage in a text only call session. In another embodiment, the user of the TTY device 124 can use text for outgoing information but receive audio for incoming information. This would be the case where the user of the TTY device 124 is speech impaired but not hearing impaired. Similarly, the TTY device 124 can be used to send speech audio but to receive text as would be the case if the user is hearing impaired but not speech impaired. In various embodiments, the functions of the TTY communication assistance system can be performed via a human operator, a text to voice computer system, a voice to text computers system, and/or any combination thereof.

In one or more embodiments, the TTY device 118, 124, 128, and 132 can share a connective channel to the IMS network with a hearing only device. For example a landline-based TTY modem device 128 can share a landline associated with a specific telephone number with a landline telephone and 148. In another example, a mobile device 116 can be used to provide audio calling communications in a hearing mode via a cellular communication channel associated with a specific telephone number. This same cellular communication channel and telephone number can be used as a communication channel for TTY communications for a peripheral TTY device 124 that connects to the IMS network 150 via the mobile device 116 and the mobility network 117. Similarly, a TTY vehicle device 132 can share a cellular communication channel and telephone number with a cell communication device 136, such as a mirror that includes an integrated cellular communication device.

In one or more embodiments, where a cellular communication device, such as the cell connection device 136 or the mobile device 116, provides a communications link from a TTY device one 124 or 132 to the IMS network 150, then the cellular communication device can include a means for indicating to the IMS network 150 whether a call is a hearing mode call or a TTY mode call. If for example a mobile device 116 is operating in a hearing mode, then the mobile device 116 can encode speech content that is received at a microphone of the mobile device 116 into an audio stream that can be transmitted over the mobility network 117 and the IMS network 150 to a remote device. Similarly, speech content from the remote device can be received at the mobile device 116 as encoded speech content that, in turn, can be decoded into speech content for reproduction at a speaker of the mobile device 116. By contrast, a TTY device 124 can convert inputted text into audio tones that can represent text values and can receive audio towns that represent text values from a remote TTY device. In one embodiment, text transmitted and/or received at a TTY device 124 can be encoded for transmission via the mobility network 117 and the IMS network 150.

In one or more embodiments, for TTY-based communication to operate correctly, the IMS network 150 can handle a hearing mode call differently than a TTY mode call. In order to immediately handle hearing mode calls, which make up the vast majority of mobile communication calls, the IMS network 150 can register mobile communication devices, such as the call connection device 136 or the mobile device 116, which are associated with a telephone number as activated for hearing mode (audio) calls. By registering a mobile device 116, the IMS network 150 can set aside system resources for immediate connection of the mobile device 116 to an initiated voice call. Conversely, the IMS network 150 can deregister a mobile communication channel and telephone number from the IMS network 150 to indicate that the mobile communications channel and the telephone number are activated for TTY mode (text) calls.

Figure 2A:
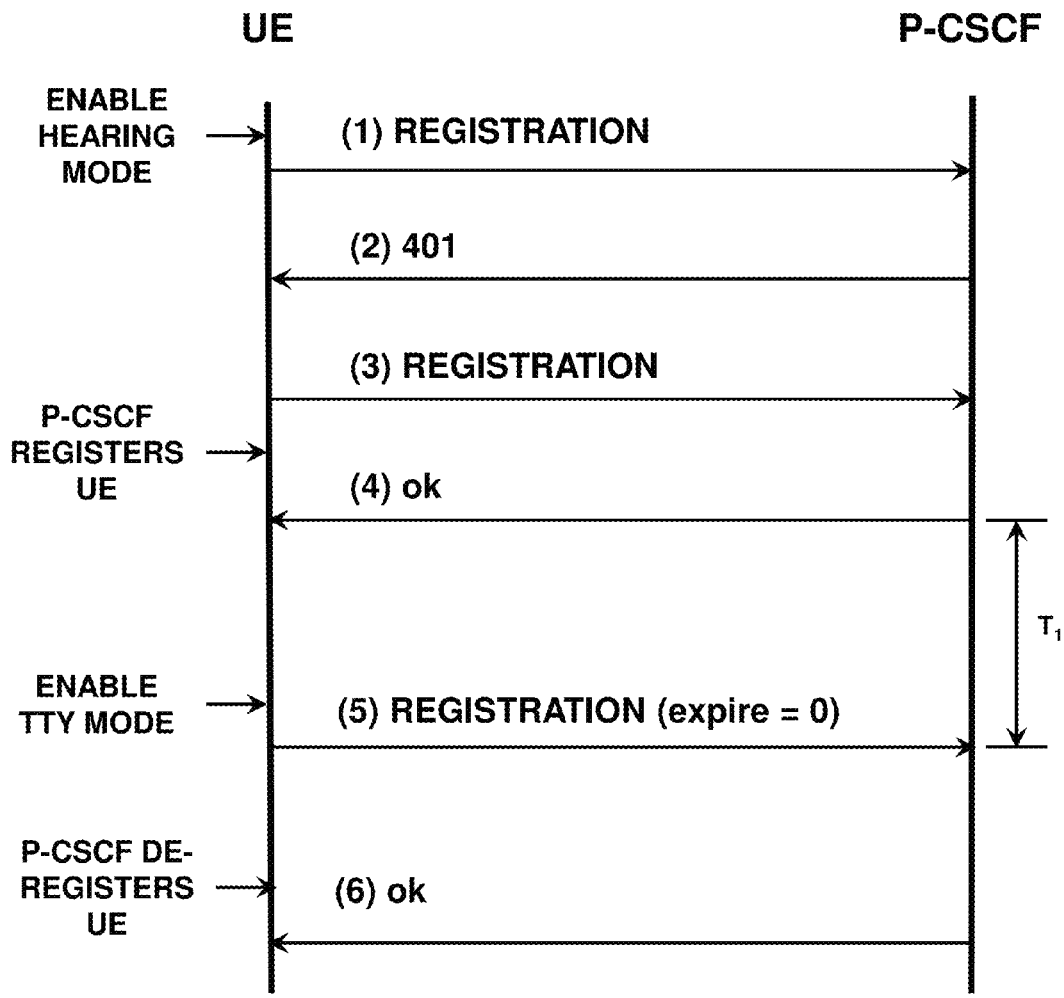
FIGS. 2A-2B depict illustrative embodiments of message sequence charts for normal and abnormal system registration transitions between hearing mode and teletype mode for a communication device.
Figure 2B:
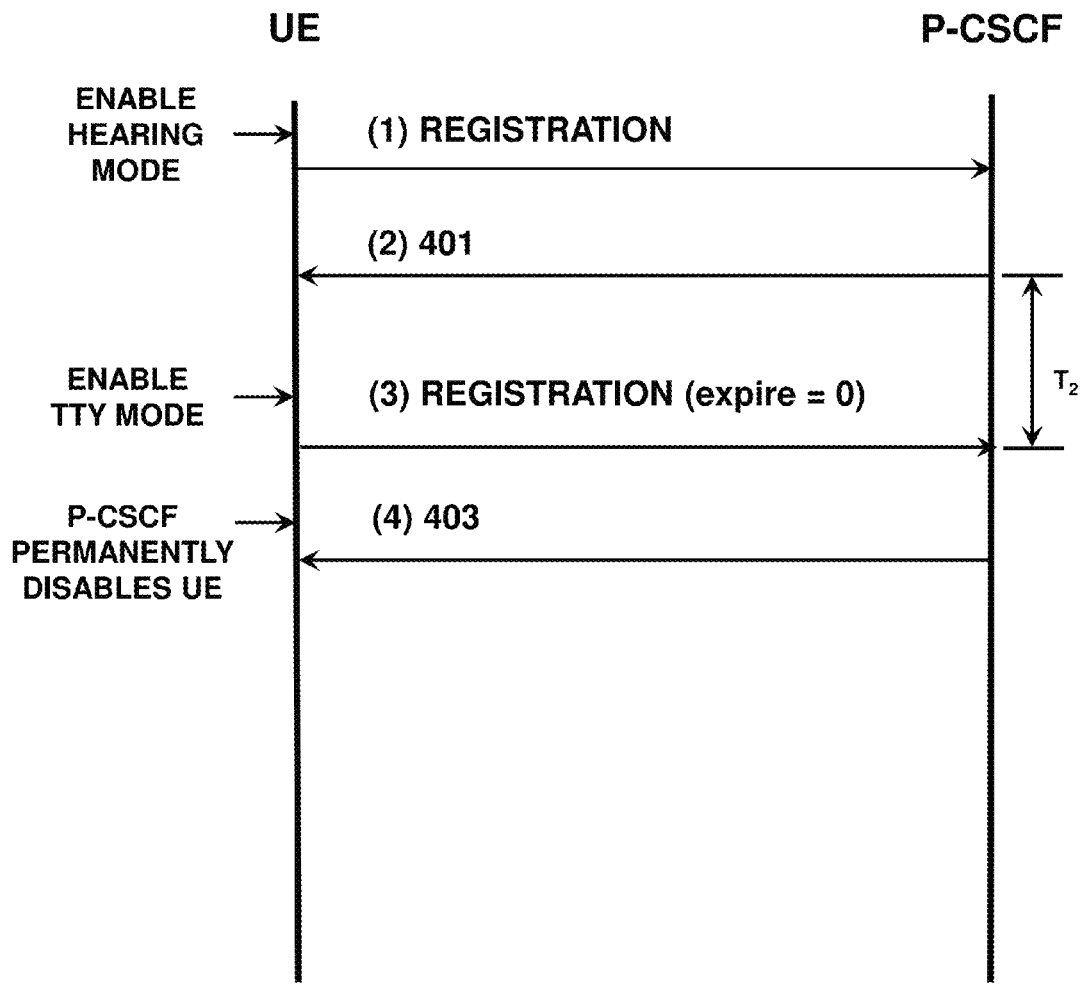

FIGS. 2A-2B depict illustrative embodiments of message sequence charts for normal and abnormal system registration transitions between hearing mode and teletype mode for a communication device. Referring particularly to FIG. 2A, an embodiment of a normal transition between hearing mode and teletype mode is illustrated. A user equipment (UE) device, such as a mobile device 116, can first enable hearing mode. For example, upon power up of the mobile device 116, the UE device 116 can send (at step (1)) a SIP message to the IMS Network 150. More particularly, the mobile device 116 can send a SIP REGISTRATION message to a Proxy-Call Session Control Function (P-CSCF) server 130 of the IMS Network 150. The P-CSCF server 130 can receive the SIP REGISTRATION message and, in turn, respond with a SIP 401 message at step (2). The SIP 401 message is a standard error response that indicates that a sending UE device 116 has requested a registration but has not provided authentication information. In response, the UE device 116 can respond to the P-CSCF server 130 a SIP 401 message by sending a second SIP REGISTRATION message at step (3), where the second SIP REGISTRATION includes authentication information that can be used by the P-CSCF server 130 to authenticate the UE device 116 for registration on the IMS system 150 as a hearing mode device. Upon receiving valid authenticating information at step (3), the P-CSCF server 130 can query a database, such as a Home Subscriber Server (HSS) to confirm that the UE device 116 is authorized for registration at the IMS network. At step (4) the P-CSCF server 130 can respond by registering the UE device 116 and, in turn, sending an "ok" message to the UE device 116. Registration of the UE device 130 can be completed by the P-CSCF server 130, and the UE device 116 can be ready for initiating and/or participating in hearing mode (speech and hearing enabled) call sessions.

At a later time ($T_1$) the UE device 116 can request entry into TTY mode. For example, a user can select TTY mode at the cell connection device 136 to allow a locally linked TTY vehicle device 132 to communicate through the cell connection device 136 to enable in vehicle TTY communications through the mobility network 117 and the IMS network 150. In another example, a peripheral TTY device 124 can be connected to a mobile device 116 for the purpose of providing TTY communications through the mobility network 117 and the IMS network 150 using the mobile device 116. In each case, to use the cell connection device 136 or the mobile device 116 as a connection point into the IMS network 150 for TTY services, the user can select TTY mode operation at cell connection device 136 or the mobile device 116. Selection of the TTY mode at a UE device 116 can cause the UE device 116 to send a SIP REGISTRATION message to the P-CSCF server 130 at step (5). The SIP REGISTRATION message associated with enabling the TTY mode can include header information to indicate that the UE device 116 is requesting deregistration from the IMS network 150. For example the SIP REGISTRATION message can include and "expire=0" header to indicate a request for the registration. In the normal registration scenario, the deregistration request is received at a point in time $T_1$ after the registration request associated with enabling the hearing mode has been completed. The P-CSCF server 130 can respond to the deregistration request by accepting the requested deregistering of the UE device 116 and sending an "ok" message to the UE device 116 confirming the deregistration at step (6).

Referring particularly to FIG. 2B, an embodiment of an abnormal transition between hearing mode and teletype mode is illustrated. In this example, the first two steps of a normal registration for hearing mode for a client UE device occur in steps (1) and (2). However, at step (3) the UE device 116 can send a deregistration request to the P-CSCF server 130 at a point in the registration process when the P-CSCF server 130 can logically expect the UE device 116 to send authorization information. At step (4) the P-CSCF server 130 can respond with a SIP 403 message indicating the reception of a forbidden request. Unfortunately, in the context of a registration process, the transmission of a SIP 403 message can cause the UE device 116 to be permanently disabled from registration. Further attempts by the UE device 116 to register and/or deregister with the IMS network 150 can be ineffective due to the permanent disabling caused by the SIP 403 message.

Figure 3:
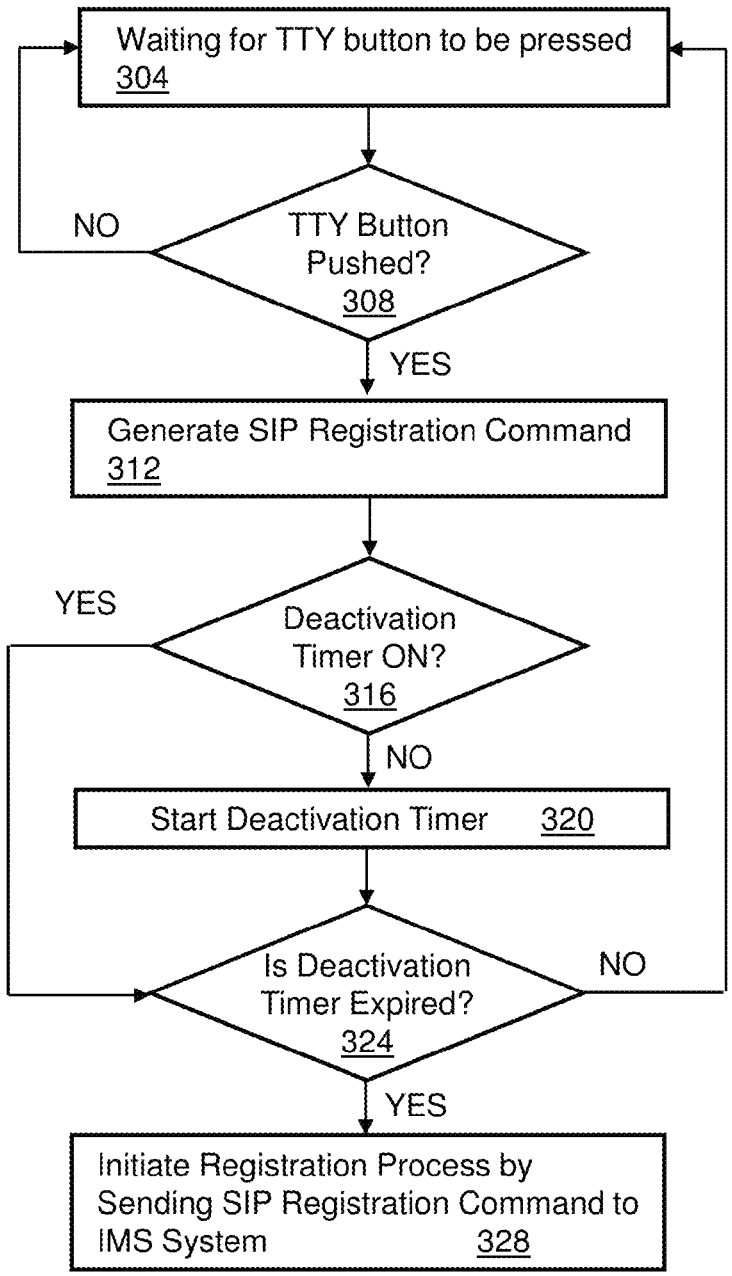
FIGS. 3-8 depict illustrative embodiments of methods used in portions of the system described in FIGS. 1 and 9-10.
Figure 4:
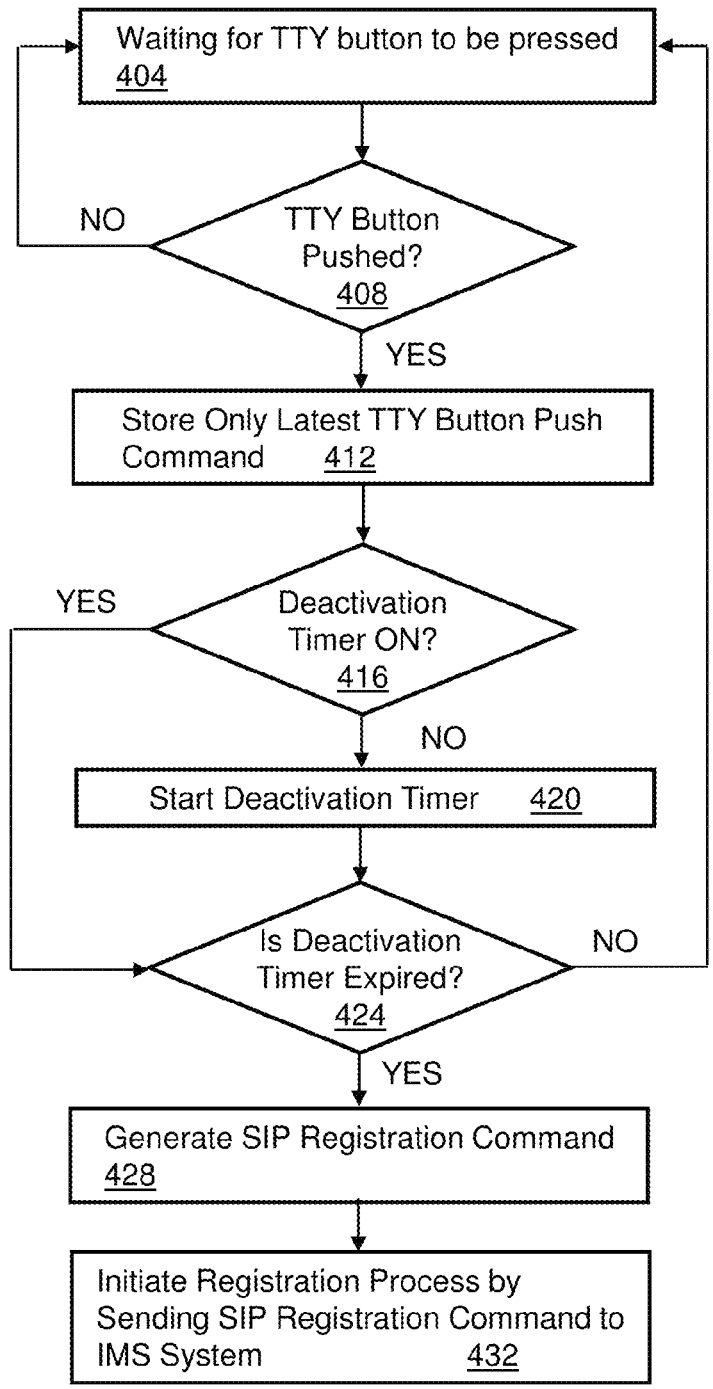
Figure 5:
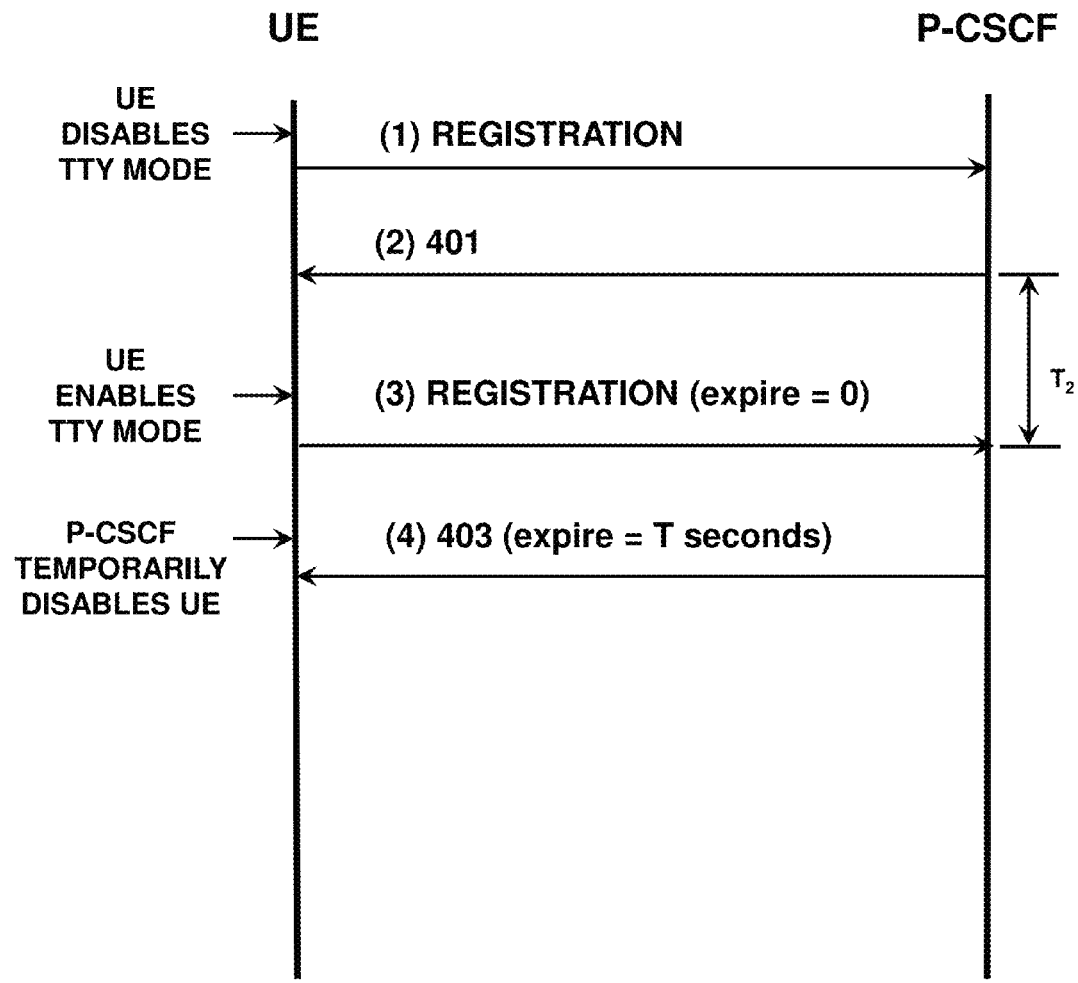

FIGS. 3-9 depict illustrative embodiments of methods used in portions of the system described in FIGS. 1 and 4-5. In particular, FIG. 3 shows illustrative embodiments of a method 300 for presenting permanent disabling of a UE device 116 by the IMS network 130 due to premature registration and/or deregistration of the UE device 116 prior to to completion of an in-process registration and/or deregistration. At step 304, the UE device 116 can wait and/or monitor for a TTY button to be selected or pressed at the UE device 116. The TTY button can be a function that can be selected at the UE device 116, a function of the UE device 116 that can automatically execute when the TTY device 124 is communicatively coupled to the UE device 116, or a combination of each. If at step 308 the UE device 116 detects a push of a TTY button, or an equivalent selection, then the UE device 116 can generate a SIP registration command in response to the TTL button push at step 312.

At step 316, the UE device 116 can determine whether a deactivation timer is ON. In one embodiment, the UE device 116 turns OFF the deactivation timer after the UE device 116 initiates a deregistration/registration process with the P-CSCF server 130 for enabling/disabling TTY mode. If the TTY button is selected at the UE device 116, as detected at step 308, will cause the deactivation timer to first be detected as OFF at step 316 and then to be turned ON at step 320. At step 324, the UE device 116 can monitor for expiration of the deactivation timer. If the deactivation timer has not expired, then the UE device 116 can return to steps 304 and 308 to continue monitoring for additional selections or pushes of the TTY button (either attempts to activate or to deactivate). If the deactivation timer has expired, then the UE device can begin the registration process at 328 by sending a SIP Registration command to the IMS System 150 and/or the P-CSCF server 130.

In one embodiment, the deactivation timer can comprise software designed to create a timing delay. For example, the deactivation timer can be a counter or a timer or a delay element or a combination of any thereof. In one embodiment, the deactivation timer can delay beginning of any registration process in response to a TTY button press or selection for a minimum time as defined by a setting of the deactivation timer. For example, if the deactivation timer is set for a ten second delay, then the deactivation timer can delay sending of the SIP Registration command to the P-CSCF server 130 for ten seconds after the last timer starting event. The deactivation timer can be started any time a user selects the TTY button and the deactivation timer is not already running from a prior TTY button selection. The method can eliminate premature attempts to register or deregister a UE device 116 prior to completion of a prior registration/deregistration. In one embodiment, the UE device 116 can generate a new SIP registration command the first time that the TTY button is selected and send this command to the P-CSCF server 130 when the deactivation timer has expired. However, subsequent selections of the TTY button will not result in the generation of additional SIP registration commands. In this respect, the method 300 simply ignores any additional TTY button pushes during the deactivation timer period. In one embodiment, an indication is displayed at the UE device 116 to indicate that the TTY button is disabled. For example, a display color for the TTY button can be changed to indicate that switching the TTY mode is temporarily disabled.

Figure 10:
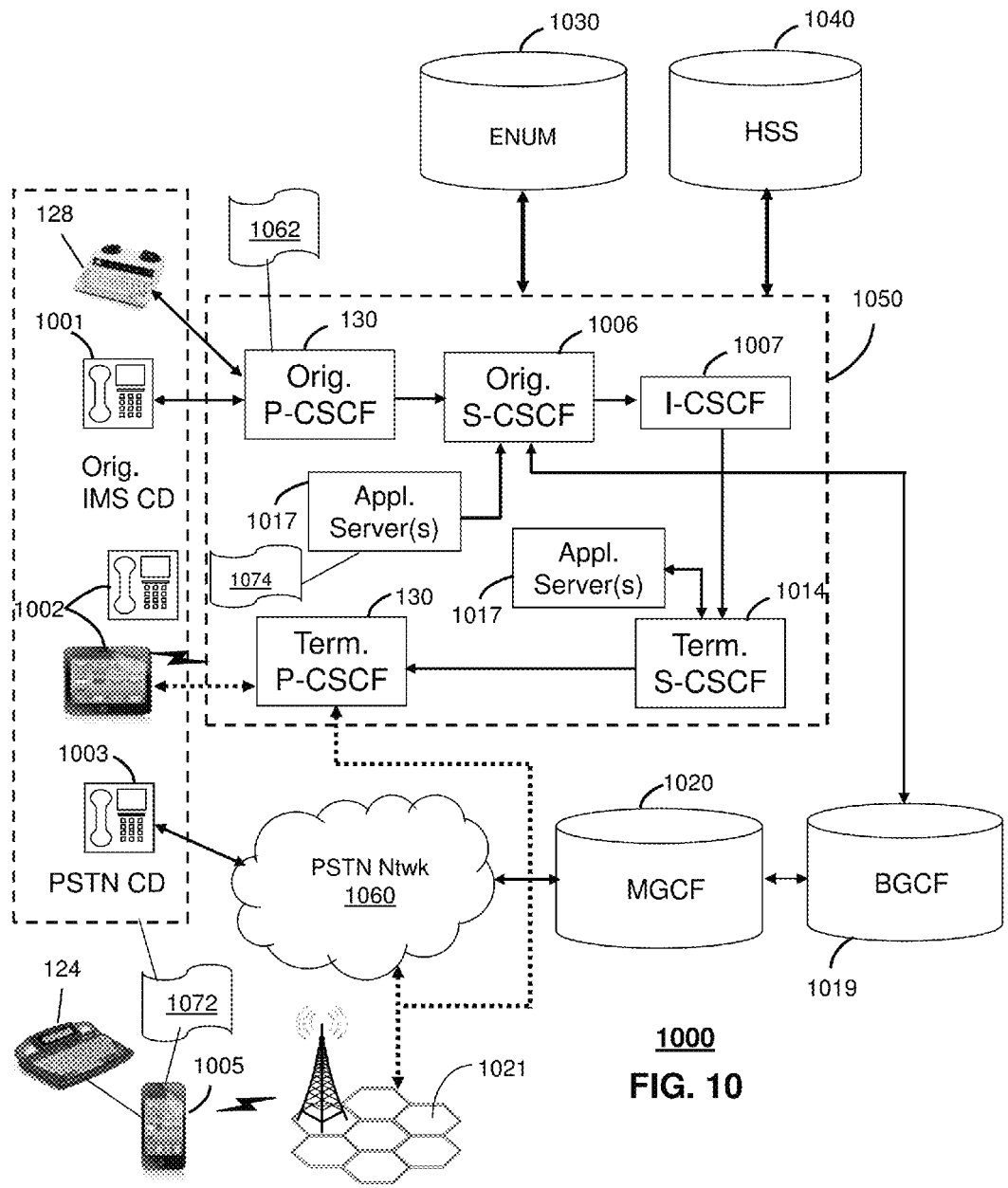
Figure 11:
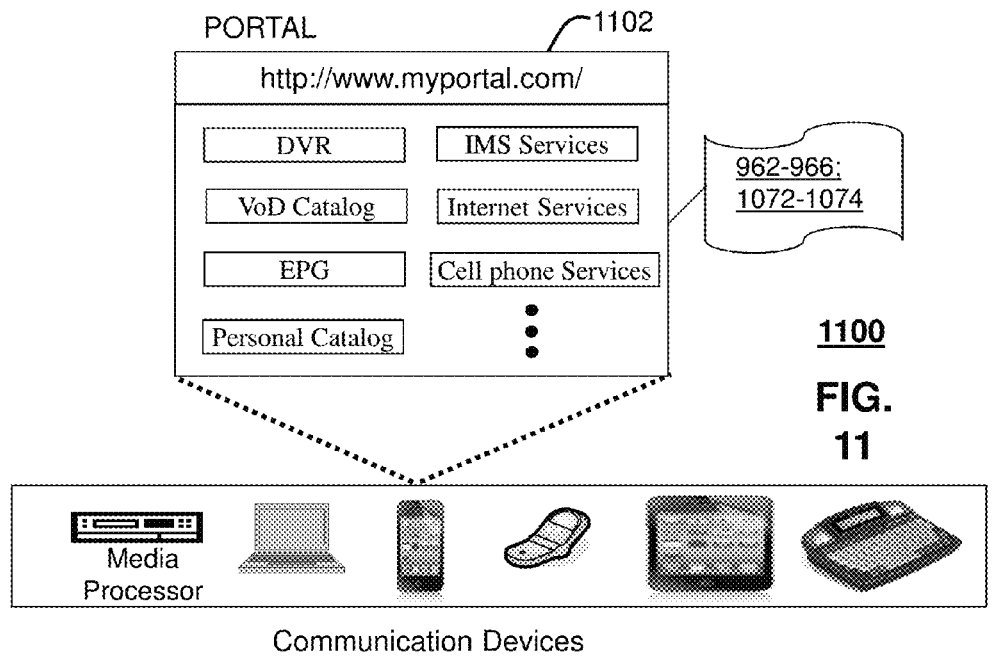
FIG. 11 depicts an illustrative embodiment of a web portal for interacting with the communication systems of FIGS. 1 and 9-10.

Referring particularly to FIG. 4, an illustrated embodiment is shown a method 400 operating in portions of the system described in FIGS. 1, 10, and 11. At step 404 the UE device 116 can wait for a TTY button selection or push or a determination at the UE device 116 that the user has requested that the TTY mode be activated or deactivated. If the TTL button is pushed at step 408, then the UE device 116 can store the TTY button push as a command at step 412. In one embodiment, the method 400 saves each the last TTY button push, while discarding all previous TTY button pushes. At step 416 the deactivation timer is checked to see if it is ON and, if not, then the deactivation timer is started at step 420. At step 424, the deactivation timer is checked for expiration. If the deactivation timer has not yet expired, then the method 400 returns to step 404 to wait for additional selections of the TTY button. The UE device 116 continues storing any additional selections of the TTY button, noting whether the user is requesting enabling or disabling TTY mode with the last of the user selections. When the deactivation timer times out at step 424, the UE device 116 then generates a SIP Registration command at step 428. The SIP Registration command is sent to the P-CSCF server 130 at step 432 to initiate the registration/deregistration process with the IMS System 150.

In one or more embodiments, the deactivation timer can be set to a specific deactivation time. The deactivation time can be selected to ensure that any prior registration/deregistration process is completed before a new registration/deregistration process is initiated. The deactivation time can't be selected based upon theoretical and/or actual registration/deregistration processing times for the IMS network 150. For example, data can be collected for registration/deregistration processing over a variety of network conditions and UE device types. Average registration/deregistration process time can be calculated along with standard deviation. The deactivation time can be selected based upon the average registration/deregistration process time. For example the deactivation time can be set for the average time plus standard deviations. In another example the deactivation time can be set to the average time multiplied by a safety factor, such as two times the average time.

The methods 300 and 400 of FIGS. 3-4 are operated at the UE device 116 and prevent permanent device deactivation due premature registration/deregistration without modification of the operations of the registration/deregistration process at the P-CSCF server 130. By contrast, FIGS. 5-8 show, via message sequence charts, illustrative embodiments of methods for preventing permanent device deactivation due to premature registration/deregistration by modifying operation of the registration/deregistration process at the P-CSCF server 130. Referring particularly to FIG. 5 and method 500, at steps (1) and (2), the UE device 116 sends a SIP Registration command to the P-CSCF server 130 to register the UE device 116 with the IMS network 150. The UE device 116 attempts to register to the IMS network 150 with hearing mode enabled and TTY mode disabled. The P-CSCF server 130 returns a SIP 401 message to the UE device 116 indicating that the registration will not be completed until authorization information is supplied to and verified by the P-CSCF server 130. However, as in the exemplary abnormal registration case of FIG. 2B, at step (3) the UE device 116 sends a SIP Command to the P-CSCF server 130 with a header set to "expire=0" indicating a deregistration request, and this deregistration request is sent at time $T_2$, which is before the initial registration request of step (1) has completed. In one embodiment, the P-CSCF server 130 responds to the premature deregistration request at step (3) with a SIP 403 message at step (4), which includes a header of "expire=T seconds", where T is set to a number of seconds for which the P-CSCF server 130 will disable the UE device 116 from registration. The altered version of the SIP 403 response causes the UE device 116 to be temporarily deactivated from the IMS network 150. During the time period T, the UE device 116 is deactivated and cannot be used in the IMS network 150 until the UE device 116 sends a new SIP Registration command requesting registration to the IMS network 150 after the expiration of the time period T. The method 500 enables the IMS network 152 temporarily deactivate the UE device 116 in response to a premature registration/deregistration request without requiring modification of the operation of the UE device 116. If the time period T is set to 10 seconds, then the UE device 116 is disabled from registration for 10 seconds.

Figure 6:
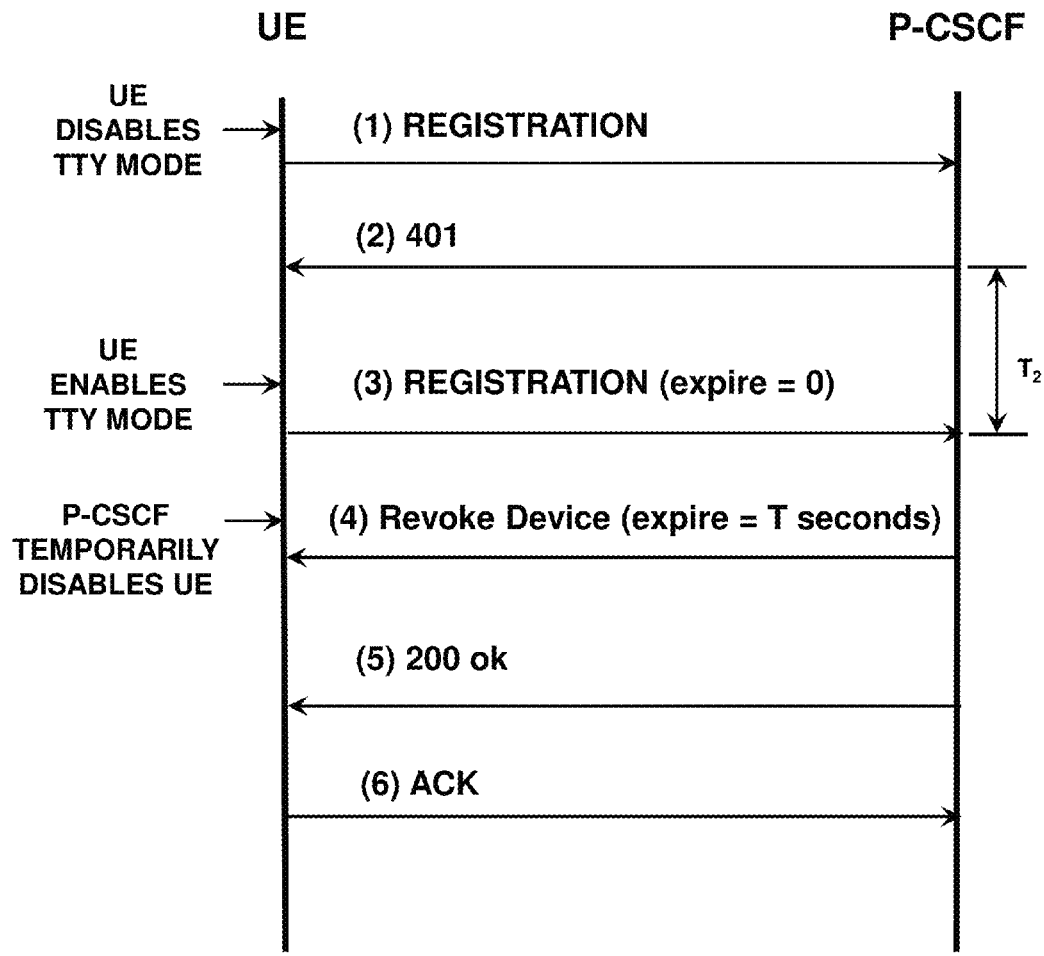

Referring particularly to FIG. 6, a method 600 issue own for the P-CSCF server 130 to handle a premature registration/deregistration sequence. In response to a SIP Registration command with "expire=0" (deregistration) at step (3) that occurs prior to completion of a registration initiated by steps (1) and (2), the P-CSCF server 130 can send a SIP Revoke Device command with a header set to "expire=T seconds." In one or more embodiments, the SIP Revoke Device command can be a variable disable device message. In one embodiment, the SIP Revoke Device command will cause the UE device 116 to be disabled from registration for a period of T seconds. In one embodiment, if the header is set to "expire=0," then the UE device 116 can be reregistered immediately. In another embodiment, if the header is set to "expire=10," then the UE device 116 can be reregistered in 10 seconds. In another embodiment, if the header is set to "expire=INF," then the UE device 116 is permanently disabled from the registration, and a phone call to the IMS network 150 administrator can be required for reregistering the device. In one embodiment, the SIP Revoke Device command is followed by a SIP 200 "ok" message and a SIP ACK message in steps (5) and (6).

Figure 7:
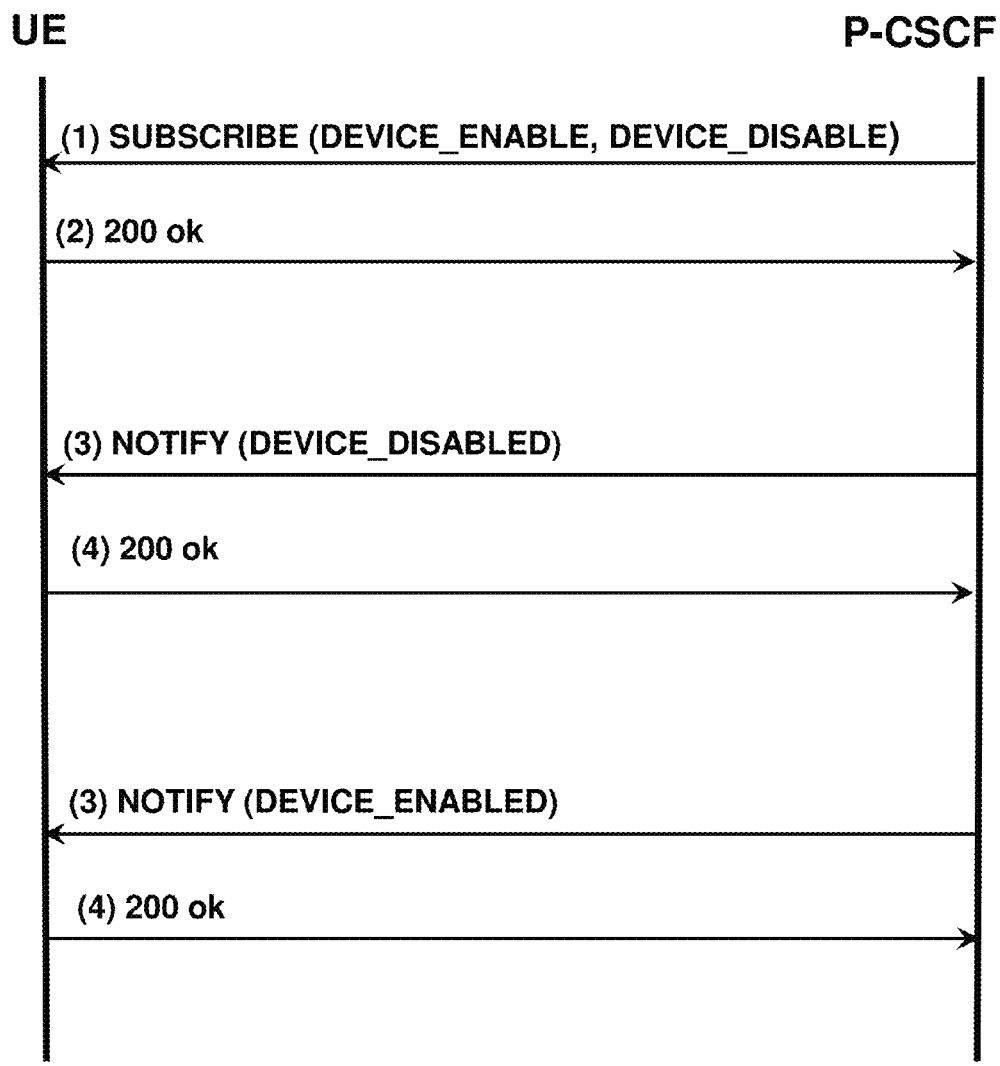

Referring now to FIG. 7, a method 700 illustrates in one or more embodiments a means for the IMS network 150 to notify the UE Device 116 of transitions between device enabled and device disabled. In one embodiment, a new notification us defined for the enabled or disabled state of the UE Device 116 at the IMS Network 150. In one embodiment, the P-CSCF server 130 stores a state logging whether the P-CSCF server will currently allow registration of the UE device 116, in which case the state is "DEVICE_ENABLED," or the P-CSCF server 130 has disabled registration of the UE device 116, in which case the state is "DEVICE_DISABLED." At step (1), the UE device 116 can send a SIP SUBSCRIBE message to the P-CSCF server 130 to request subscription to the device enabled or disabled state. At step (2), the P-CSCF server 130 can send a SIP 200 ok to acknowledge the subscription. At step (3), the P-CSCF server 130 can send a SIP NOTIFY message to the UE device 116, which can be acknowledged by the UE device 116 with a SIP 200 ok message at step (4). In this case, the P-CSCF server 130 can notify the UE device 116 that registration of the UE device 116 has been disabled by the P-CSCF server 130. At step (5), the P-CSCF server 130 can send a different SIP NOTIFY message to the UE device 116, which can be acknowledged by the UE device 116 with a SIP 200 ok message at step (6). In this case, the P-CSCF server 130 can notify the UE device 116 that registration of the UE device 116 has been enabled by the P-CSCF server 130.

Figure 8:
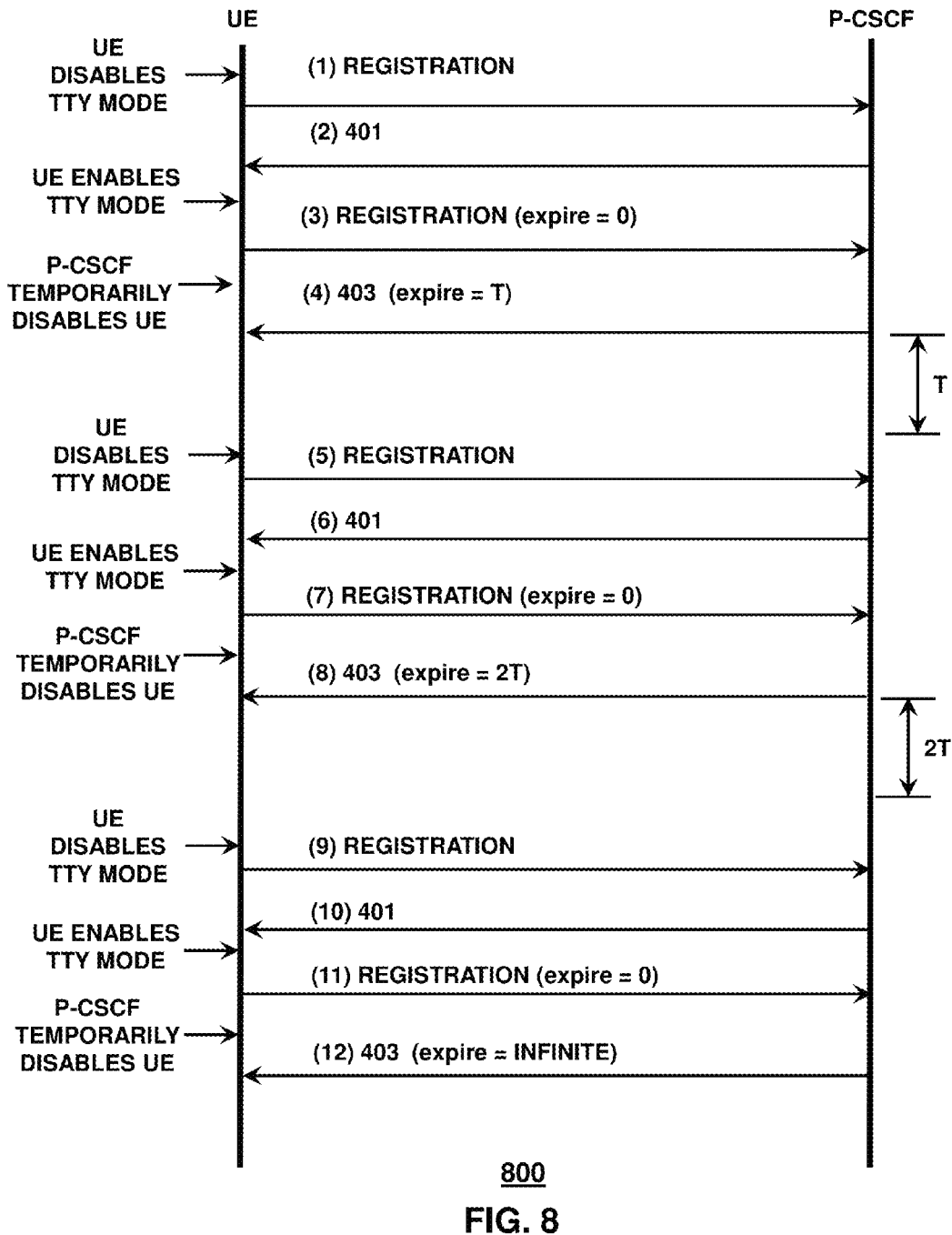

Referring now particularly to FIG. 8, one or more embodiments are shown in message sequence chart form. The method 800 of FIG. 8 implements altering the time T which the P-CSCF server 130 temporarily disables registration of the UE device 116 after a failed registration initiation. For example, in steps (1)-(4) the P-CSCF server 130 can disable subsequent registration of the UE device 116 for a period of T seconds in response to the failed registration sequence. Subsequently, at steps (5)-(8) the P-CSCF server 130 can respond to another failed registration sequence by altering the time period for disabling further registrations to 2T. In steps (9)-(12) the P-CSCF server 130 can further respond to another failed registration by setting the time period to INFINITY, which disables registration of the UE device 116 for an indefinite time period (until the P-CSCF server 130 sends a Revoke message with "expire=0"). In one embodiment, the time period can be altered according to exponential steps. In another embodiment, the time period can be altered according to geometric steps. In another embodiment, the time period can be altered to a maximum time period value without being set to infinity. The ability to progressively increase the time period for disabling registration in response to multiple failed registration attempts can protect the IMS network 150 as a fail-safe from service attacks.

Figure 9:
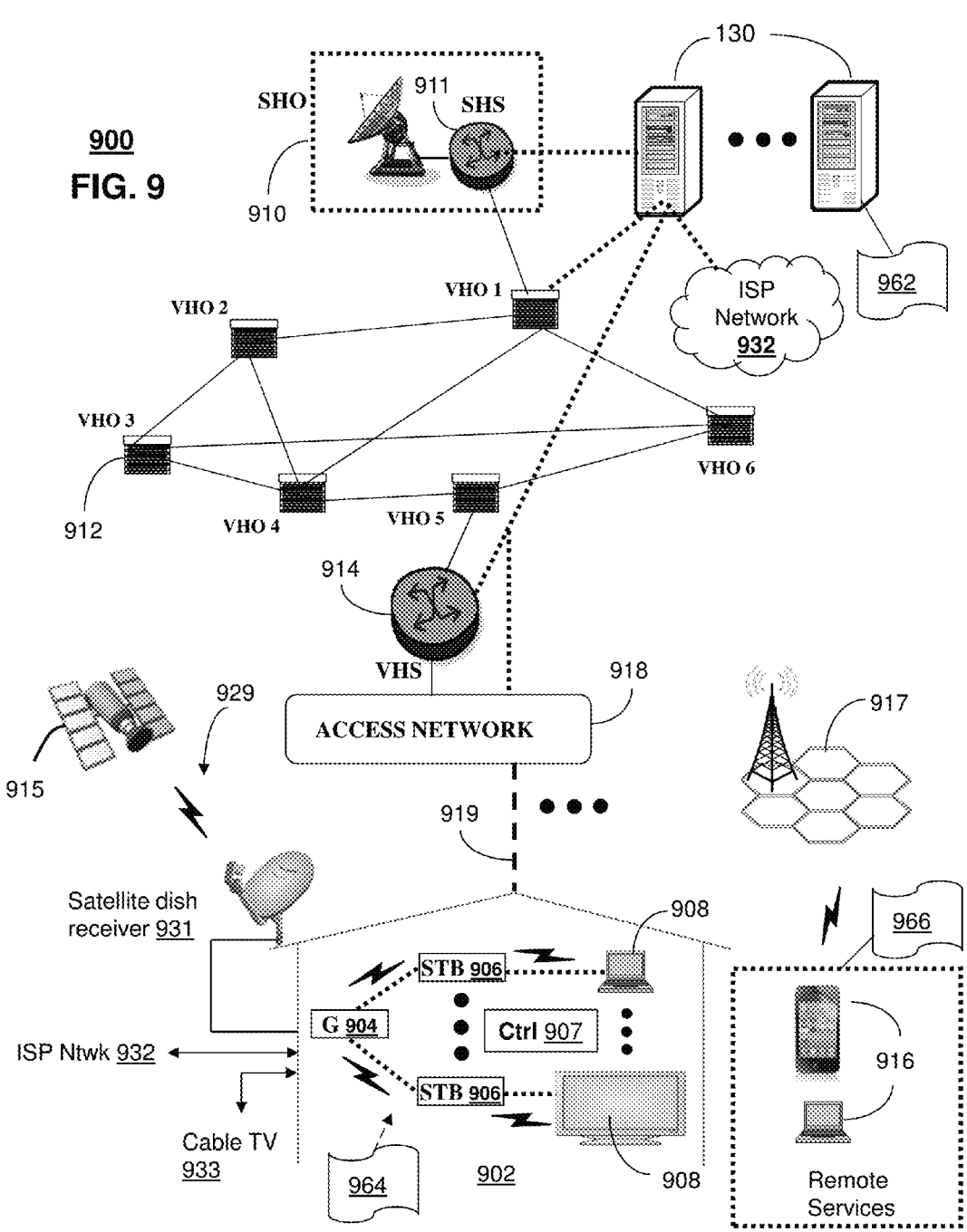
FIGS. 9-10 depict illustrative embodiments of communication systems that provide communication and media services for communication devices according to embodiments illustrated in FIG. 1.

FIG. 9 depicts an illustrative embodiment of a first communication system 900 for delivering media content. The communication system 900 can represent an Internet Protocol Television (IPTV) media system. Communication system 900 can be overlaid or operably coupled with the system of FIG. 1 as another representative embodiment of communication system 100. The P-CSCF server 130, mobile communication device 116, computer device 118, and cell connection device 136 can be implemented within the communication system 900 for providing TTY services and transitioning between registration and deregistration of communication devices for enabling hearing mode and TTY mode.

The IPTV media system can include a super head-end office (SHO) 910 with at least one super headend office server (SHS) 911 which receives media content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol.

The VHS 914 can distribute multimedia broadcast content via an access network 918 to commercial and/or residential buildings 902 housing a gateway 904 (such as a residential or commercial gateway). The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a P-CSCF server 930. The P-CSCF server 930 can use computing and communication technology to perform function 962, which can include among other things, copying user profile information from the primary data repository 165 to the secondary data repository 160, detecting modifications a first user profile information at the secondary data repository 160, identifying usage events for communication devices 116 based on the modification of first user profile, modifying a second user profile at the secondary data repository according to the usage event, and replicating modifications to user profiles from the secondary data repository to the primary data repository according to an update policy 168. For instance, function 962 of server 930 can be similar to the functions described for the P-CSCF server 130 of FIG. 1 in accordance with methods 200-800. The media processors 906 and wireless communication devices 916 can be provisioned with software functions 964 and 966, respectively, to utilize the services of the P-CSCF server 930. For instance, functions 964 and 966 of media processors 906 and wireless communication devices 916 can be similar to the functions described for the communication devices 116 of FIG. 1 in accordance with method 200-800.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 10 depicts an illustrative embodiment of a communication system 1000 employing IP Multimedia Subsystem (IMS) network architecture to facilitate the combined services of circuit-switched and packet-switched systems. Communication system 1000 can be overlaid or operably coupled with system 100 of FIG. 1 and communication system 900 of FIG. 9, as another representative embodiment of communication systems 100 and 900. The P-CSCF server 130, mobile communication device 116, computer device 118, cell communication device 136, TTY device 124, and TTY modem device 128 can be implemented within the communication system 1000 for providing TTY services and transitioning between registration and deregistration of communication devices for enabling hearing mode and TTY mode.

Communication system 1000 can comprise a Home Subscriber Server (HSS) 1040, a tElephone NUmber Mapping (ENUM) server 1030, and other network elements of an IMS network 150. The IMS network 150 can establish communications between IMS-compliant communication devices (CDs) 1001, 1002, Public Switched Telephone Network (PSTN) CDs 503, 1005, and combinations thereof by way of a Media Gateway Control Function (MGCF) 1020 coupled to a PSTN network 1060. The MGCF 1020 need not be used when a communication session involves IMS CD to IMS CD communications. A communication session involving at least one PSTN CD may utilize the MGCF 1020.

IMS CDs 1001, 1002 can register with the IMS network 150 by contacting a Proxy Call Session Control Function (P-CSCF) which communicates with an interrogating CSCF (I-CSCF), which in turn, communicates with a Serving CSCF (S-CSCF) to register the CDs with the HSS 1040. To initiate a communication session between CDs, an originating IMS CD 1001 can submit a SIP INVITE message to an originating P-CSCF 1004 which communicates with a corresponding originating S-CSCF 1006. The originating S-CSCF 1006 can submit the SIP INVITE message to one or more application servers (ASs) 1017 that can provide a variety of services to IMS subscribers.

For example, the application servers 1017 can be used to perform originating call feature treatment functions on the calling party number received by the originating S-CSCF 1006 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1006 can submit queries to the ENUM system 1030 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1007 to submit a query to the HSS 1040 to identify a terminating S-CSCF 1014 associated with a terminating IMS CD such as reference 1002. Once identified, the I-CSCF 1007 can submit the SIP INVITE message to the terminating S-CSCF 1014. The terminating S-CSCF 1014 can then identify a terminating P-CSCF 130 associated with the terminating CD 1002. The P-CSCF 130 may then signal the CD 1002 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 10 may be interchangeable. It is further noted that communication system 1000 can be adapted to support video conferencing. In addition, communication system 1000 can be adapted to provide the IMS CDs 1001, 1002 with the multimedia and Internet services of communication system 900 of FIG. 9.

If the terminating communication device is instead a PSTN CD such as CD 1003 or CD 1005 (in instances where the cellular phone only supports circuit-switched voice communications), the ENUM system 1030 can respond with an unsuccessful address resolution which can cause the originating S-CSCF 1006 to forward the call to the MGCF 1020 via a Breakout Gateway Control Function (BGCF) 1019. The MGCF 1020 can then initiate the call to the terminating PSTN CD over the PSTN network 1060 to enable the calling and called parties to engage in voice and/or data communications.

It is further appreciated that the CDs of FIG. 10 can operate as wireline or wireless devices. For example, the CDs of FIG. 10 can be communicatively coupled to a cellular base station 1021, a femtocell, a WiFi router, a Digital Enhanced Cordless Telecommunications (DECT) base unit, or another suitable wireless access unit to establish communications with the IMS network 150 of FIG. 10. The cellular access base station 1021 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 10.

Cellular phones supporting LTE can support packet-switched voice and packet-switched data communications and thus may operate as IMS-compliant mobile devices. In this embodiment, the cellular base station 1021 may communicate directly with the IMS network 150 as shown by the arrow connecting the cellular base station 1021 and the P-CSCF 130.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The P-CSCF server 130 of FIG. 1 can be operably coupled to communication system 1000 for purposes similar to those described above. P-CSCF server 130 can perform function 1062 and thereby provide user profile services to the CDs 1001, 1002, 1003 and 1005 of FIG. 10. For example, CDs 1001, 1002, 1003 and 1005, can be adapted with software to perform function 1072 to utilize the services of the P-CSCF server 130 of FIG. 1 in accordance with methods 200-800 of FIGS. 2-8. P-CSCF server 130 can be an integral part of the application server(s) 1017 performing function 1074, which can be substantially similar to function 964 and adapted to the operations of the IMS network 150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

FIG. 11 depicts an illustrative embodiment of a web portal 1102 of a communication system 1100. Communication system 1100 can be overlaid or operably coupled with system 100 of FIG. 1, communication system 900, and/or communication system 1000 as another representative embodiment of system 100 of FIG. 1, communication system 900, and/or communication system 1000. The web portal 1102 can be used for managing services of system 100 of FIG. 1 and communication systems 900-1000. A web page of the web portal 1102 can be accessed by a Uniform Resource Locator (URL) with an Internet browser using an Internet-capable communication device such as those described in FIGS. 1 and 9-10. The web portal 1102 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906. The web portal 1102 can also be used for provisioning IMS services described earlier, provisioning Internet services, provisioning cellular phone services, and so on.

The web portal 1102 can further be utilized to manage and provision software applications 962-966, and 1072-1074 to adapt these applications as may be desired by subscribers and/or service providers of system 100 of FIG. 1 and communication systems 900-1000. For instance, users of the services provided by the P-CSCF server 130 can log into their on-line accounts and provision the P-CSCF server 130 with a user profile that is updated to the secondary data repository to enable communication with devices described in FIGS. 1, 9, and 10. Service providers can log onto an administrator account to provision, monitor and/or maintain the system 100 of FIG. 1 or P-CSCF server 130 for providing TTY services and transitioning between registration and deregistration of communication devices for enabling hearing mode and TTY mode.

Figure 12:
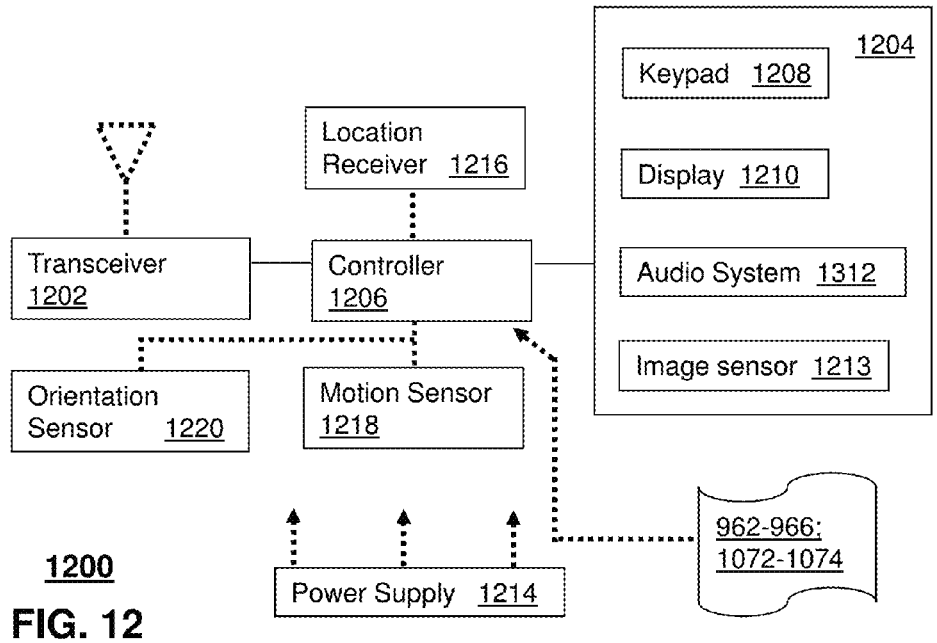
FIG. 12 depicts an illustrative embodiment of a communication device.

FIG. 12 depicts an illustrative embodiment of a communication device 1200. Communication device 1200 can serve in whole or in part as an illustrative embodiment of the devices depicted in FIG. 1, and FIGS. 4-5. Communication device 1200 in whole or in part can represent any of the communication devices described in FIGS. 1, 9, an 10 and can be configured to perform portions of methods 200-800 of FIGS. 2-8.

Communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/ GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface with graphical user interface (GUI) elements that can be selected by a user with a touch of a finger. The touch screen display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable applications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in threedimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a reset button (not shown). The reset button can be used to reset the controller 1206 of the communication device 1200. In yet another embodiment, the communication device 1200 can also include a factory default setting button positioned, for example, below a small hole in a housing assembly of the communication device 1200 to force the communication device 1200 to re-establish factory settings. In this embodiment, a user can use a protruding object such as a pen or paper clip tip to reach into the hole and depress the default setting button. The communication device 1200 can also include a slot for adding or removing an identity module such as a Subscriber Identity Module (SIM) card. SIM cards can be used for identifying subscriber services, executing programs, storing subscriber data, and so forth.

The communication device 1200 as described herein can operate with more or less of the circuit components shown in FIG. 12. These variant embodiments can be used in one or more embodiments of the subject disclosure.

The communication device 1200 can be adapted to perform the functions of devices of FIG. 1, the media processor 906, the media devices 908, or the portable communication devices 916 of FIG. 9, as well as the IMS CDs 1001-1002 and PSTN CDs 1003-1005 of FIG. 10. It will be appreciated that the communication device 1200 can also represent other devices that can operate in systems of FIG. 1 and communication systems 900-1000 of FIGS. 9-10 such as a gaming console and a media player.

The communication device 1200 shown in FIG. 12 or portions thereof can serve as a representation of one or more of the devices of system of FIG. 1, communication system 900, and communication system 1000. In addition, the controller 1206 can be adapted in various embodiments to perform the functions 462-466 and 572-574, respectively, for providing TTY services and transitioning between registration and deregistration of communication devices for enabling hearing mode and TTY mode.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 13:
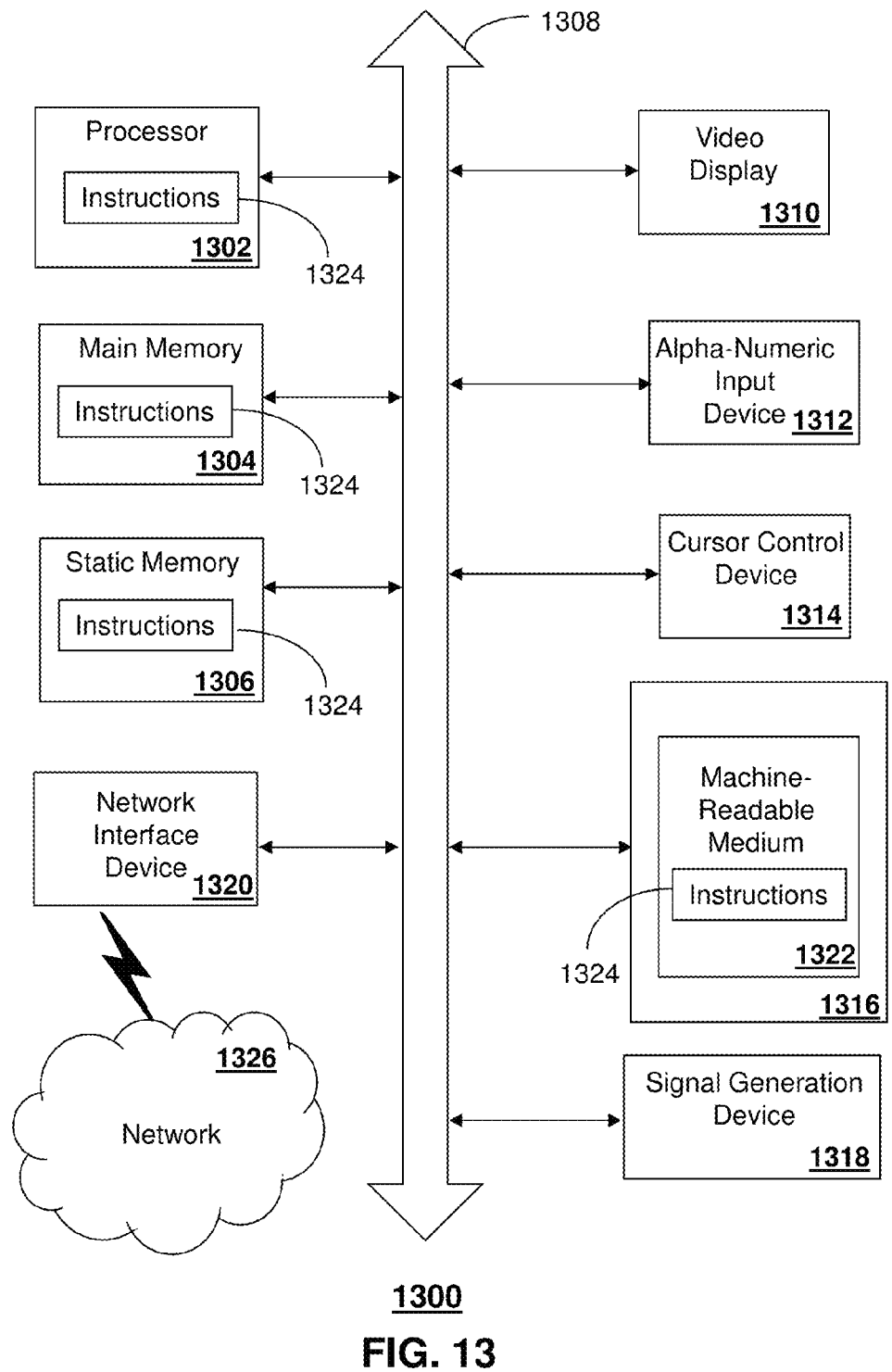
FIG. 13 is a diagrammatic representation of a machine in the form of a computer system within which a set of instructions, when executed, may cause the machine to perform any one or more of the methods described herein.

FIG. 13 depicts an exemplary diagrammatic representation of a machine in the form of a computer system 1300 within which a set of instructions, when executed, may cause the machine to perform any one or more of the methods described above for providing TTY services and transitioning between registration and deregistration of communication devices for enabling hearing mode and TTY mode. One or more instances of the machine can operate, for example, as the P-CSCF server 130, the media processor 106, the mobile communication device 116, and/or the computer device 118 and other devices of FIGS. 1, 9, and 10. In some embodiments, the machine may be connected (e.g., using a network 1326) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor (or controller) 1302 (e.g., a central processing unit (CPU)), a graphics processing unit (GPU, or both), a main memory 1304 and a static memory 1306, which communicate with each other via a bus 1308. The computer system 1300 may further include a display unit 1310 (e.g., a liquid crystal display (LCD), a flat panel, or a solid state display). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320. In distributed environments, the embodiments described in the subject disclosure can be adapted to utilize multiple display units 1310 controlled by two or more computer systems 1300. In this configuration, presentations described by the subject disclosure may in part be shown in a first of the display units 1310, while the remaining portion is presented in a second of the display units 1310.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device comprising:
   a memory to store executable instructions; and
   a processor communicatively coupled to the memory, wherein the processor, responsive to executing the executable instructions, performs operations comprising:
   receiving an input from a user interface requesting a transition from a hearing mode to a teletype mode;
   generating a first session initiation protocol (SIP) command for switching from registration to deregistration of the communication device at a telecommunication network responsive to the input, wherein the first SIP command initiates deregistration of the communication device when transitioning from the hearing mode to the teletype mode;
   determining whether a disable registration period has been started;
   initiating the disable registration period responsive to the disable registration period not having been started;
   determining whether the disable registration period has expired responsive to the disable registration period having been started;
   transmitting the first SIP registration command as a first request to the telecommunication network to switch from the registration to the deregistration of the communication device responsive to the disable registration period having expired; and
   transitioning from the hearing mode to the teletype mode according to a response from the telecommunication network.

2. The communication device of claim 1, wherein the operations further comprise:
   responsive to transitioning from hearing mode to teletype mode:
   initiating a communication link with a teletype device; and
   transmitting a call session request to the telecommunication network for initiating a call session with a second communication device conforming to the teletype mode.

3. The communication device of claim 2, wherein the operations further comprise initiating the disable registration period, prior to the receiving of the input, responsive to a prior attempt to register the communication device.

4. The communication device of claim 1, wherein the generating of the first SIP command is further responsive to the disable registration period having expired.

5. The communication device of claim 1, wherein the determining whether the disable registration period has started is responsive to the generating of the first SIP command.

6. The communication device of claim 1, wherein the operations further comprise:
   responsive to transitioning from hearing mode to teletype mode:
   transmitting a first teletype communication to a teletype communication assistance system of the telecommunication network; and
   receiving a second teletype communication from the teletype communication assistance system.

7. The communication device of claim 6, wherein the operations further comprise receiving the first teletype communication from a teletype device according to text captured at the teletype device.

8. The communication device of claim 6, wherein the operations further comprise:
   receiving text at a user interface; and
   transmitting the first teletype communication to the teletype communication assistance system according to the text that is received.

9. The communication device of claim 1, wherein the disable registration period is generated according to one of a timer, a counter, or a combination thereof.

10. The communication device of claim 1, wherein the disable registration period is based on a length of time required for the telecommunication network to switch between the registration and the deregistration of the communication device.

11. A non-transitory computer-readable storage device comprising executable instructions which, responsive to being executed by a processor, facilitate performance of operations comprising:
    receiving an input from a user interface requesting a transition from a hearing mode to a teletype mode;
    generating a first session initiation protocol (SIP) command for switching from registration to deregistration of a communication device at a telecommunication network responsive to the input, wherein the first SIP command initiates deregistration of the communication device when transitioning from the hearing mode to the teletype mode;
    determining whether a disable registration period has been started;
    initiating the disable registration period responsive to the disable registration period not having been started;
    determining whether the disable registration period has expired responsive to the disable registration period having been started;
    transmitting the first SIP registration command as a first request to the telecommunication network to switch from the registration to the deregistration of the communication device responsive to the disable registration period having expired; and
    transitioning from the hearing mode to the teletype mode according to a response from the telecommunication network.

12. The non-transitory computer-readable storage device of claim 11, wherein the generating of the first SIP command is further responsive to the disable registration period having expired.

13. The non-transitory computer-readable storage device of claim 11, wherein the determining whether the disable registration period has started is responsive to the generating of the first SIP command.

14. The non-transitory computer-readable storage device of claim 11, wherein the operations further comprise:
responsive to transitioning from hearing mode to teletype mode:
transmitting a first teletype communication to a teletype communication assistance system of the telecommunication network; and
receiving a second teletype communication from the teletype communication assistance system.

15. The non-transitory computer-readable storage device of claim 14, wherein the operations further comprise receiving the first teletype communication from a teletype device according to text captured at the teletype device.

16. The non-transitory computer-readable storage device of claim 14, wherein the operations further comprise:
receiving text at a user interface; and
transmitting the first teletype communication to the teletype communication assistance system according to the text that is received.

17. The non-transitory computer-readable storage device of claim 11, wherein the disable registration period is generated according to one of a timer, a counter, or a combination thereof.

18. The non-transitory computer-readable storage device of claim 17, wherein the disable registration period is generated according to one of a timer, a counter, or a combination thereof.

19. A method, comprising:
receiving, by a system comprising a processor, an input from a user interface requesting a transition from a hearing mode to a teletype mode;
generating, by the processor, a first session initiation protocol (SIP) command for switching from registration to deregistration of a communication device at a telecommunication network responsive to the input, wherein the first SIP command initiates deregistration of the communication device when transitioning from the hearing mode to the teletype mode;
determining, by the system, whether a disable registration period has been started;
initiating, by the system, the disable registration period responsive to the disable registration period not having been started;
determining, by the system, whether the disable registration period has expired responsive to the disable registration period having been started;
transmitting, by the system, the first SIP registration command as a first request to the telecommunication network to switch from the registration to the deregistration of the communication device responsive to the disable registration period having expired; and
transitioning, by the system, from the hearing mode to the teletype mode according to a response from the telecommunication network.

20. The method of claim 19, further comprising
storing, by the system, a first indication of the input that is received for requesting the transition from the hearing mode to the teletype mode;
receiving, by the system, a second input from the user interface for requesting the transition from the hearing mode to the teletype mode, wherein the second input is received before the disable registration period has expired; and
storing, by the system, a second indication of the second input for requesting the transition from the hearing mode to the teletype mode while discarding the first indication.

* * * * *